US012625287B2

(12) United States Patent
Chancellor et al.

(10) Patent No.: US 12,625,287 B2
(45) Date of Patent: May 12, 2026

(54) SYSTEM AND METHOD FOR SIMULATING NON-HOMOGENOUS SPACE RADIATION ENVIRONMENT

(71) Applicant: Board of Supervisors of Louisiana State University and Agricultural and Mechanical College, Baton Rouge, LA (US)

(72) Inventors: Jeff Chancellor, Baton Rouge, LA (US); Megan Chesal, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 220 days.

(21) Appl. No.: 18/701,830

(22) PCT Filed: Oct. 19, 2022

(86) PCT No.: PCT/US2022/047093
§ 371 (c)(1),
(2) Date: Apr. 16, 2024

(87) PCT Pub. No.: WO2023/069489
PCT Pub. Date: Apr. 27, 2023

(65) Prior Publication Data
US 2024/0427035 A1 Dec. 26, 2024

Related U.S. Application Data

(60) Provisional application No. 63/257,434, filed on Oct. 19, 2021.

(51) Int. Cl.
*G01T 1/29* (2006.01)
*G06T 12/20* (2026.01)
*G21G 4/04* (2006.01)

(52) U.S. Cl.
CPC ............ *G01T 1/2985* (2013.01); *G06T 12/20* (2026.01); *G21G 4/04* (2013.01)

(58) Field of Classification Search
CPC ......... G01T 1/02; G01T 1/2985; G06T 12/20; G21K 1/00; G21G 4/04
See application file for complete search history.

(56) References Cited

U.S. PATENT DOCUMENTS

2003/0136924 A1 7/2003 Kraft et al.
2008/0067452 A1 3/2008 Moriyama et al.
(Continued)

OTHER PUBLICATIONS

Chancellor et al., "Limitations in predicting the space radiation health risk for exploration astronauts", npj Microgravity (2018) 4:8. (Year: 2018).*

*Primary Examiner* — Casey Bryant
(74) *Attorney, Agent, or Firm* — Venable LLP; Keith G. Haddaway; Ryan T. Ward

(57) ABSTRACT

Systems, methods, and computer-readable storage media for simulating a non-homogenous space environment. A system can include a ion beam generator, a moderator block, a radiation detector, at least one processor which can execute operations including: transmitting, 7o the ion beam generator, a beam generation signal, the beam generation signal specifying an energy level of an ion beam and a duration of the ion beam, the ion beam making first contact with the moderator block and subsequent contact with a test animal; receiving, from the radiation detector after the duration of the ion beam is completed, energy deposition within the test animal. The system can then execute computational models to determine moderator block computational results animal computational results, then generate projected human results for the ion beam based on the moderator block computational results and the animal computational results.

20 Claims, 6 Drawing Sheets

(56) References Cited

U.S. PATENT DOCUMENTS

| 2014/0179978 | A1 | 6/2014 | Pantell et al. |
| 2016/0030769 | A1 | 2/2016 | Cameron et al. |
| 2018/0022478 | A1* | 1/2018 | Chancellor ............. B64G 7/00 |
| | | | 73/865.6 |
| 2020/0200926 | A1 | 6/2020 | Stucker |

* cited by examiner

SYSTEM AND METHOD FOR SIMULATING NON-HOMOGENOUS SPACE RADIATION ENVIRONMENT

CROSS-REFERENCE

This application is a U.S. National Stage of PCT/US2022/047093, filed Oct. 19, 2022, which claims priority to U.S. provisional patent application No. 63/257,434 filed Oct. 19, 2021, the contents of which are incorporated herein by reference in their entirety.

BACKGROUND

1. Technical Field

The present disclosure relates to simulating a non-homogenous space environment, and more specifically to a system which replicates the multi-ion species and energies found in the space radiation environment and predicts the impact of those species and energies on biological systems.

2. Introduction

Current radiobiology studies on the effects of galactic cosmic ray (GCR) radiation utilize monoenergetic beams, where the projected dose for an exploration mission is given using highly acute exposures. This methodology, however, does not accurately replicate the multi-ion species and energies found in the space radiation environment: nor does it reflect the low dose-rate found in interplanetary space. Studies have shown that the biological response and disease pathogenesis due to space radiation is unique to the dose distribution generated by a nonhomogeneous, multi-energetic spectrum. Another factor to consider is the interaction of space radiation with the spacecraft hull. The GCR spectrum is attenuated through the material, decreasing the energy of heavy charged particles, and frequently causing fragmentation into lighter, less energetic elements, further increasing the complexity of the of the intravehicular (IVA) radiation spectrum which the astronauts are exposed to. As such, in order to correctly assess the impact GCR has on biological systems, accurate modeling of the spectrum astronauts are exposed to is critical.

DETAILED DESCRIPTION

Figure 1A:
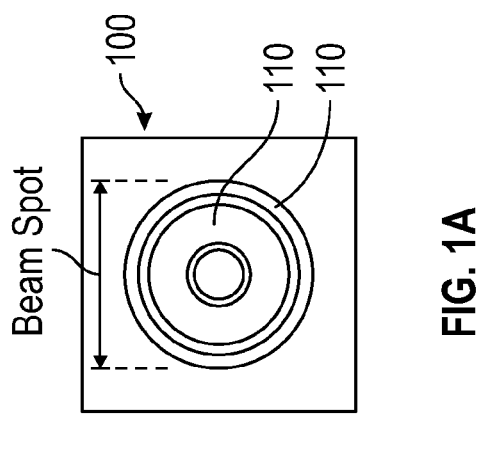
FIGS. 1 and 1A show a side elevation and front elevation view, respectively, of a moderator block in accordance with at least some embodiments.

Various embodiments of the disclosure are described in detail below. While specific implementations are described, it should be understood that this is done for illustration purposes only. Other components and configurations may be used without parting from the spirit and scope of the disclosure.

In order to understand the systematic effect that radiation has on the human body, the three-dimensional dose distribution measured in humans needs to be accurately replicated in the animal models. Most animal experiment use pig or mice models, and due to the large difference in size between an average human and these animals, the original GCR spectrum can produce different dose distributions in each. For example, because humans are thicker than most test animals, which allows for more interactions and deposition to occur within the body, the spatial dose distribution in the mouse model that is typically used for space radiobiology experiments does not emulate that which would be incurred by astronauts. This not only hampers translation of data obtained from animal models to humans, but also limits the understanding of the effects GCR on humans' biology, and the development of effective radiation countermeasures.

In order to accurately examine biological responses, the animals need to be exposed to a completely different radiation spectrum which mimics space radiation. This distinct ground-based space radiation analog exposes each major organ and tissue in animal, at which point a mammalian model can be used to determine values of absorbed dose and radiation quality that correspond to those in astronauts. The combination of the distinct radiation exposure and the mammalian model results in a physiological scalable analog that can simulate the non-homogenous space radiation environment in a laboratory setting.

The space radiation environment emulator described herein uses principles of energy loss and spallation of highly energetic iron ions to produce a spectrum with a wide range of particle species and energies (illustrated in FIG. 4 and described below). Moderator blocks developed as described herein take into account the anatomy and physiology of the model in order to mimic the energy disposition for humans from the original moderator block design (illustrated in FIGS. 1 and 2 and described below). 1 GeV/n (1 Giga electronic Volt/nucleon) iron ($^{56}$Fe) was chosen as the ion species and energy of the primary ion given that iron is the heaviest nuclei with significant contribution to absorbed dose in the GCR environment. The LET (Linear Energy Transfer) is approximately 150 keV/$\mu$m, which has been shown to be about the peak effectiveness for producing chromosomal damage indicative of cancer outcomes in murine models. This energy and ion choice also has ranges much greater than the presumed shorter depths of the moderator block (e.g., approximately 25 cm). This ensures that the effects of fragmentation dominate while instigating a positive dose attenuation and minimal change in the LET of primaries that survive transport through the block. The correct fluence of particles required for each layer can be determined using numerical particle transport methods. Analytical prediction of the resulting particle species, their multiplicity, and corresponding energies is not possible to any high degree of accuracy. The energy loss of the primary will increase with depth and this begins to counter the expected decrease in average LET caused by fragmentation. As the primary ranges out and velocity decreases, the LET rises sharply at depths that are small compared to the mean free path for a nuclear interaction and the effects of energy loss outweigh those of fragmentation. Moderator geometry and thickness needs to balance the effects of energy loss and fragmentation. To overcome the highly stochastic results of primary and progeny fragmentation, the system incrementally varies the geometry in each layer to quantify what material(s) and properties (e.g. length, width normal to the primary beam's path, etc.) of each layer can best produce a desired range of ions and resulting energies. The key factor in this approach is to match each layer thickness and width normal to the beam spot so that it contributes to a specific portion of the desired LET spectrum. The final moderator block is designed so that the addition of each layer will result in a final field, F(i,E'), such that:

$$F(P,E')=\Sigma_n g_n(m,v)f(p,E_i)=G(M,V)f(p,E_i),$$

Where f(p,E$_i$), is the impinging field of the primary ion, I, with initial energy, E$_i$, The function g(m,v) describes the individual layers of material, m, and volume v (e.g. length, width, height). The individual layers are summed and G(M, V) describes the final moderator block material(s), M and geometry, V. The function, F(P,E'), represents the resulting field of ion species, P, with energies, E', that closely simulates the desired LET spectrum, e.g. the intravehicular LET spectrum measured on previous spaceflights. A three-dimensional version of the moderator block can then be recreated using combinatorial geometry for a Monte Carlo simulation. This includes accurate determinations of the width, length, and curvature of the various channels and cuts. The chemical composition and density specific to each of the moderator's layers can also be specified for determining the material properties, such as atomic structure, ionization potential, electron shell configuration, etc. The numerical simulations can then be performed using multi-core, high performance computers (HPCs) to model particles traversing through thick absorbers and to approximate the desired LET spectrum.

The system and method described herein can be used to develop moderator blocks for various animal models. Each moderator block can be constructed of a single material, or can be heterogenous in nature A single beamline energy and particle species can be used, with no switching off of the beam and no adjustments to the beamline. The block can be placed at the end of the beamline and easily removed if needed. The optimal moderator block can reduce the beam such that animal tissues used in testing are stressed from radiation in the same manner that astronaut tissue is stressed from space radiation. In determining block configurations, using macroscopic dosimetric quantities, such as dose values, can cause errors. While the exact errors can vary, consider one example. The absorbed dose is the energy per unit volume given in Joules per kilogram of mass. Given that radiation particulate interacts with cells and DNA molecules on the scale of microns or Angstroms, then the error for the solutions provided by the system disclosed herein is not measurable. As such, energy deposition is the metric used to determine if a moderator block achieves the design goals, i.e. matching the previously determined human organ values. Block configurations preferably minimize the relative differences in the end results between animal tissues and simulated astronaut tissues. At present, such minimization could, for example, be between 15-25%, though in future configurations could be reduced even lower.

The system as described herein can, for example, rely on a single heavy ion beam of energy. The advantage of this single beam is that single beam exposure reduces the difficulty of beam output. Additionally, the beamline structure does not require additional tampering, only the insertion of a moderator block in the path of the beam. This means that any beamline with the specific ion and energy could use the moderator block, not just current GCR simulators (which may rely on a single beam or a series of beams (which may be shot in rapid succession)).

The system and method described herein can operate for as long as the beamline can maintain a steady output of ions. For example, the system described herein is capable of operating for greater than twenty-four hour periods (though can also be operated for shorter periods as needed).

Each animal model being considered can have its own moderator block design and setup. Due to the difference in size and anatomy of the animals, a scaled moderator block can be constructed for each scenario to properly adjust the radiation spectrum accordingly. Charged particles have a finite range, and in manipulating the energies and species of particles through the moderator block, particles can be produced that will more precisely replicate the target values. All moderator blocks can be placed at the end of the beam path, with at least a meter between animal subjects and the end of the moderator block. The materials for the moderator blocks can be hydrogenous in nature, as this allows for a balance of energy loss and spallation fragments from a primary heavy ion beam. The amount and types of ion and energy used can depend on the animal, however exemplary ions which show promise for mirroring human exposure to GCR include Silicon, Oxygen, and Iron ions (though other ions are similarly possible).

Systems configured as described herein can include different types of computational models: for example, an animal computational model, an electronics computational model, and a moderator block computational model. The animal model can have a high resolution, can be constructed from CT (Computed Tomography) images, and can allow for determination of dosimetric quantities at specific organ sites. The moderator block computational model can rely on a similar geometry, but can also have much more complicated patterns, and is not limited to combinatorial geometry. The electronics computational model can, for example, capture the dose received after passing through the moderator block, then model how different types of electronics will respond to that radiation. This electronics computational model can, for example, take into account the materials used for the specific electronics, their relative sensitivity to radiation, etc., and predict the rate at which components within the electronics exposed to that level of radiation will deteriorate. The animal computational model can, for example, be used to convert the dose and energy for an animal exposure to that of an astronaut, while the moderator block computational model can be used to create a desired spectrum. Preferably, these models work in tandem to convert the radiation detected in an exposed animal to the projected radiation of an astronaut. However, in other configurations the respective models can be separated and individually applied to other situations.

Each of these models can be constructed from tetrahedral-type geometry, which can allow for high precision and resolution, as well as accurate determination of various quantities (absorbed dose, dose equivalent, and energy deposition) to organs and regions. Applying this exemplary method of construction to the moderator block provides enormous flexibility in design plans, allowing for more complex block designs. Additionally, tetrahedral-type models for phantoms can be integrated into Monte Carlo simulations and can provide precise determination of organ dosimetric values.

As stated above, the system can use energy deposition as the metric to extrapolate results. Energy deposition is more closely related to individual particle reactions than absorbed dose (the traditional metric), and can also be applied to microscopic volumes.

Figure 1:
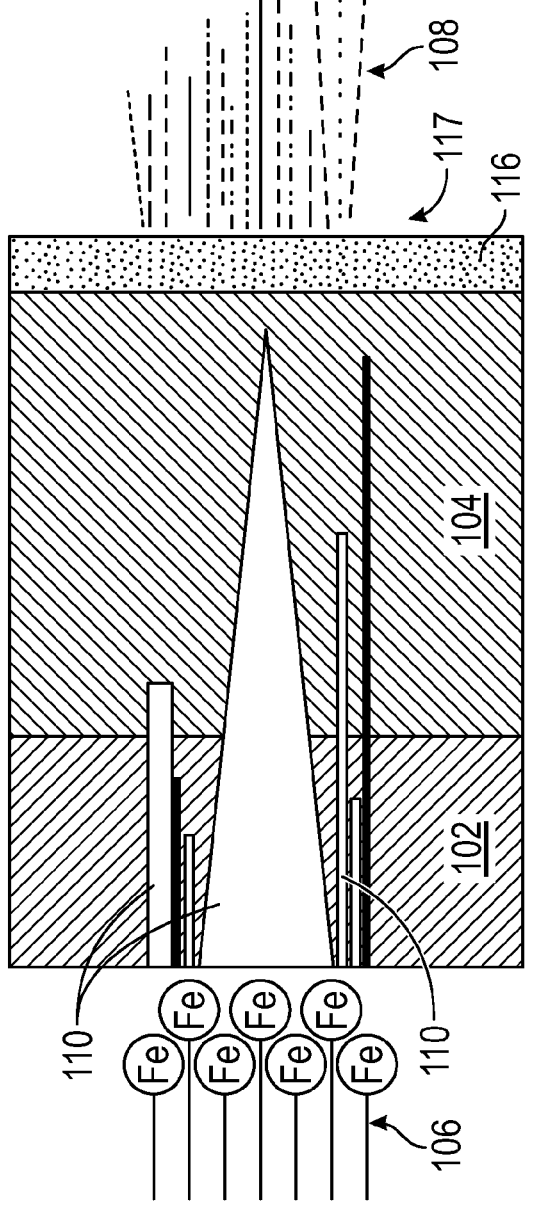

Turning to FIGS. 1 and 1A, there are shown side (FIG. 1) and front elevation (FIG. 1A) views of a moderator block 100 in accordance with at least some embodiments. As illustrated, moderator block 100 is composed of two materials 102 and 104, which may be, for example, proton rich materials such as polyethylene, high-density polyethylene (HDPE), LEXAN, or other polycarbonate plastics. However, other materials may be used in accordance with the principles of the disclosure. In some embodiments materials 102 and 104 may be the same composition, and in other embodiments materials 102 and 104 may be (as illustrated) different compositions. In operation a beam 106 of energetic ions impinges on moderator block 100. Energetic ion beam 106 may, for example, comprise 1000 mega-electron-volt (1000 MeV or 1 Gev) iron ions (e.g. $^{56}$Fe). Moderator block 100 may also include a high-Z scattering layer 116. In at least some embodiments, the high-Z scattering layer can be made from materials such as Lead ($^{78}$Pb) or Tungsten ($^{74}$W). However, any suitable high-Z material may be used. The high-Z scattering layer can provide Coulomb scattering to help make the resulting field homogenous across the exiting surface 117. It will be appreciated by those skilled in the art having the benefit of the disclosure that the high-Z scattering layer may also be placed closer to surface 106 to attenuate fission neutron production. A final field, F(i,E), of particles 108 is emitted from moderator block 100. These may be generated within moderator block 100 by nuclear reactions and as spallation products.

A moderator block 100 may be designed so that the final field, F(i,E) closely simulates the IVA LET spectrum measured on previous spaceflights, F(i,E)=Gf[i,E(i)], Where E(i) is the kinetic energy of ion i, f(i,E) the initial field impinging the target moderator block, and G is a function that represents the geometry and intrinsic material properties affecting charged particles traversing the moderator. This target moderator block can be placed in front of, e.g., a 1000 MeV Iron ($^{56}$Fe) particle beam, as described above, and nuclear spallation processes can create modest amounts of the desired fragments resulting in a complex mixed field of particle nuclei (hereinafter, simply "final particle field") with different atomic numbers Z in the range $0<Z<=26$ and LETs$<=500$) keV/micron. 1 GeV/n iron ($^{56}$Fe) was chosen as the ion species and energy of the primary ion given that iron is the heaviest nuclei with significant contribution to absorbed dose in the GCR environment. Modifications to the internal geometry and chemical composition of the materials in the target moderator block allow for shaping the emulated IVA LET F(i,E) to specific spectra (e.g., external GCR field, Mars spectrum, etc.). For example, a plurality of cuts or voids 110 can be disposed within moderator block 100 allow for shaping the final particle field IVA LET.

The calculations can be performed using a Monte Carlo particle transport simulation PHITS (Particle and Heavy Ion Transport code System) to model particles traversing through thick absorbers and to develop a close approximation of the desired LET spectrum. PHITS features an event generator mode that produces a fully correlated transport for all particles with energies up to 200 GeV. The system, by using PHITS, calculates the average energy loss and stopping power of the absorbers by using the charge density of the material, and calculates the momentum of the primary particle by tracking the fluctuations of energy loss and angular deviation. PHITS can utilize the SPAR code (a Fortran program for computing stopping powers and ranges for muons, charged pions, protons and heavy ions) for simulating ionization processes of the charge particles and the average stopping power, dE/dx. The stopping power, dE/dx, is equivalent to the energy loss per unit path length of the primary ion, or LET, thus LET=dE/dx, and quantifies how much energy is lost in a material. As illustrated in FIG. 1, the primary beam 106, e.g. 1 GeV $^{56}$Fe is accelerated from the left, propagated through the moderator block 100 and emerging along with progeny fragments generated during spallation reactions with the block materials. The field continues to the right where a scoring plane 116 is located 1 m from the moderator block face. Particle species, energy, and directional cosines are recorded for analysis and LET calculations. The system then calculates the simulated LET values for tissue using the stopping power formula.

The length of travel through a medium can not only positively (or negatively) enhance the number of desired lower-Z ions generated and the energy loss of the primary and secondary ions generated, but it can also affect nuclei yields by depleting the number of high-Z ions still needed. In order to generate the GCR spectrum, the moderator geometry and thickness need to balance the effects of energy loss and fragmentation. This is done by designing the moderator block 100 geometry so that it replicates the attenuation function G for the desired field F(i,E) via F(i, E)=Gf[i,E(i)]. The attenuation G describes the various channels of the moderator block and is a function of the geometry and the intrinsic properties of each material utilized in the moderator design. Each channel or "cut" or "void" 110 represents a separate path the primary ions can travel through the block. The diameter, length and material of each cut are chosen to induce specific spallation and energy loss events of the primary ion. This provides a method to selectively induce specific fragmentation and energy losses that result in the emerging final particle field having the desired distribution of emerging ions and energies.

Figures 2, 2A:
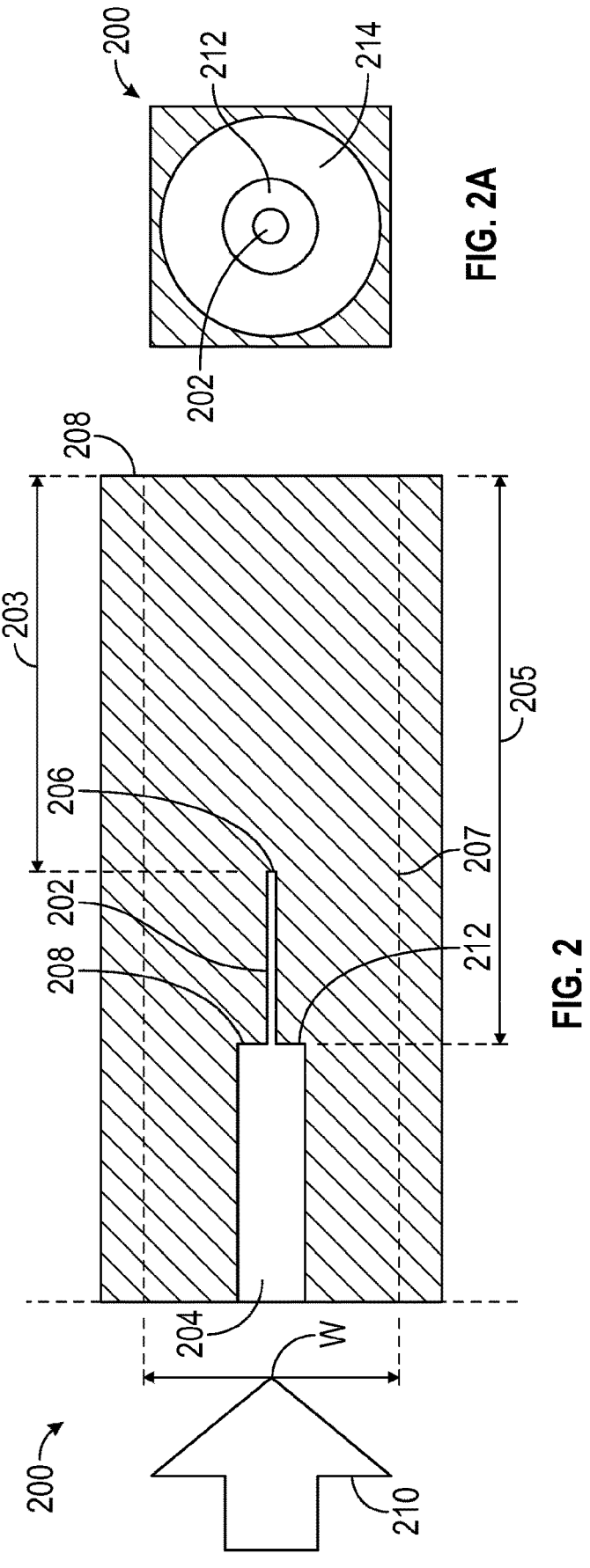
FIGS. 2 and 2A show a side elevation and front elevation, respectively, view of a moderator block in accordance with at least some embodiments.

Referring now to FIGS. 2 and 2A, FIGS. 2 and 2A show side and front elevation views, respectively, of a moderator block 200 in accordance with at least some embodiments. Moderator block 200 may have a length 207 which may be 40 centimeters (cm) in at least some embodiments. In this example, moderator block 200 includes two voids 202 and 204. An end 206 of void 202 is located 20 cm from end 208 of moderator block 200 opposite energetic ion beam 210. Ion beam 210 may, for example, have a diameter of 30 cm. Thus a length of material 203 remains between end 206 and end 208 of the moderator block. Length 203 may be 20 cm in at least some embodiments. An end 212 of void 208 is located a length 205 from end 208 of moderator block 200. Length 205 may be 30 cm in at least some embodiments. A cross-sectional area of void 202 may be about 0.70615 cm$^2$, and an area of annular region 212 may be about 141.2304 cm$^2$ and an area of annular region 214 may be about 549.92176 cm$^2$ in at least some embodiments.

Moderator block 200 may be used to emulate the IVA LET spectrum as measured during the Mir 18 and Mir 19 missions. The Mir Space Station had an orbital inclination and flight altitude of 51.6 degrees and approximately 200 nautical miles (approximately 370 km). Beginning in March of 1995, NASA astronauts flew several long-duration missions on the Mir Space Station, returning to earth via the Space Shuttle. Others have measured the integral LET spectrum that was directly attributed to GCR ions and their spallation progeny using Tissue Equivalent Proportional Counters (TEPC) and plastic nuclear track detectors located at six different areas of the vehicle. Contributions from neutrons and non GCR particles (e.g., Van Allen Belt ions) were not considered in order to closely replicate their measured results. The results demonstrate that the distribution of LET obtained from the beam-line simulation fits extremely well with the prediction for particles having a LET between 20 keV/micron and 200 keV/micron and with a reasonable fit for LET up to 500 keV/micron.

The system disclosed herein can execute simulations using the Monte Carlo particle transport simulation software PHITS, in order to model particles traversing through thick absorbers and develop a close approximation to the desired LET spectrum. The correct fluence of particles required can be determined using data from satellite measurements, intravehicular measurements during space missions, or from models of the GCR spectrum. PHITS has been previously compared to experimental cross section data using similar energies and materials. The output can be appropriately scaled to closely match the average daily LET rate measured.

Figure 3:
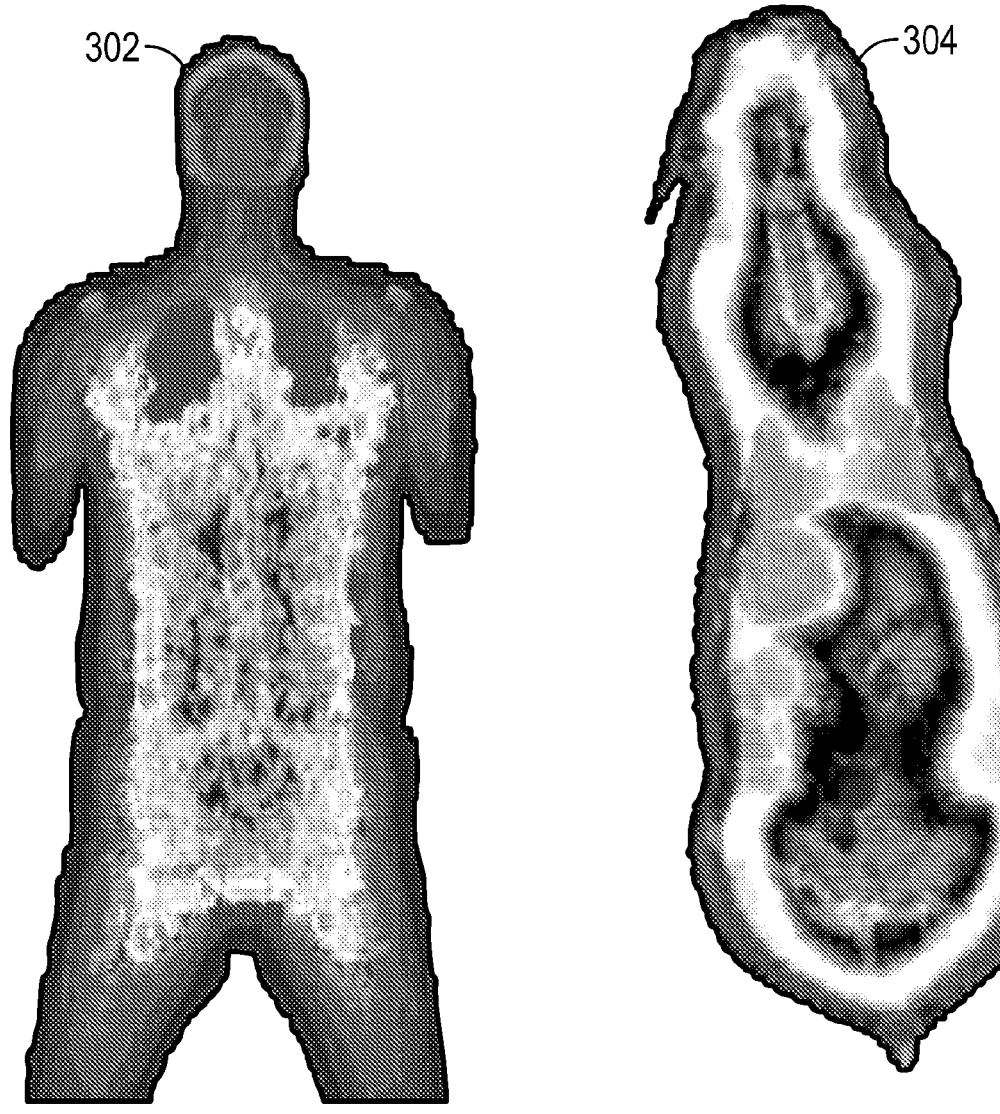
FIG. 3 illustrates example results from a Monte Carlo simulation on CT (Computerized Tomography) scans of a human male (left) and a mouse (right).

FIG. 3 illustrates example results from a Monte Carlo simulation on CT (Computerized Tomography) scans of a human male (left) 302 and a mouse (right) 304. The different shading shows the organ dose to major systems following a radiation exposure that mimics the environment measured on International Space Station. Higher radiation doses are found on the appendages (i.e., head, arms, and legs), as well as the exterior of the torso of the human male 302, and widely found on the exterior of the mouse 304. Lower radiation doses are found in the interiors of the human 302 and mouse 304, with the mouse 304 having widespread amounts of lower radiation throughout its inner organs. As illustrated, the inner organs of the human 302 are minimally exposed to the radiation, while the exterior/skin of the human is exposed to higher radiation. With the mouse 304, while the exterior of the mouse is exposed to higher radiation, the inner organs of the mouse received a higher level of exposure than the human being.

Figure 4:
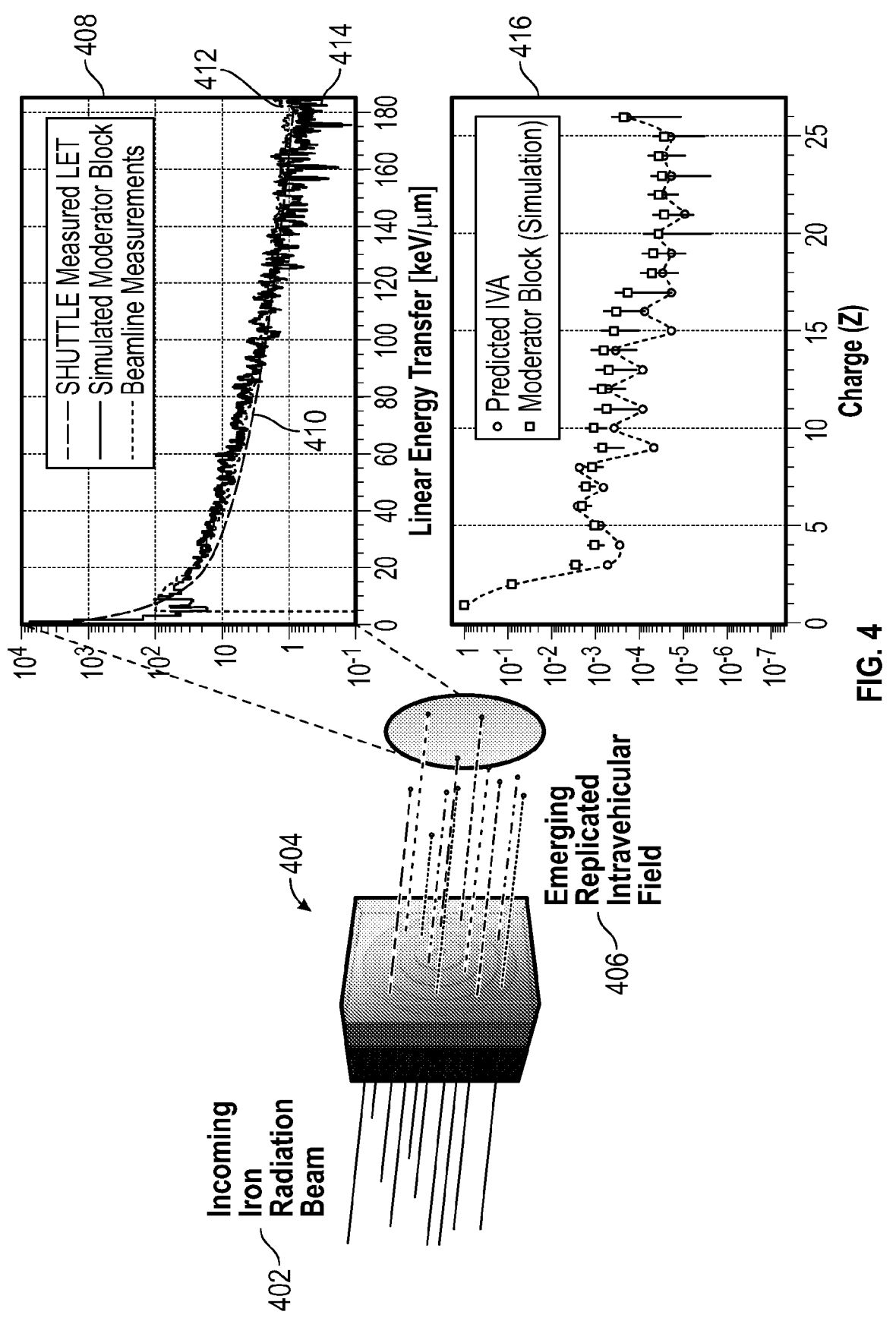
FIG. 4 illustrates the concept of the moderator block geometry.

FIG. 4 illustrates the concept of the moderator block geometry. A primary beam 402 of $^{56}$Fe (iron) is selectively degraded with a moderator block 404 designed to produce a desired distribution 406 of energies and ions simulating the intravehicular space radiation environment (i.e., the Emerging Replicated Intravehicular Field 406). In the top right panel 408 is illustrated: Integrated LET per day 410, the results of the model disclosed herein 414, and the beam line measurements prototype moderator block that replicates the numerically determined geometry 412. The LET of five single-ion exposures are shown to highlight the lack in breadth of energies in current radiobiological studies. In the bottom right panel 416 is illustrated: Relative abundance of intravehicular ions in the exiting field created by the moderator block plotted against the predicted as a function of Z. Both distributions have been normalized to the most prolific ion, hydrogen (Z=1).

Figure 5:
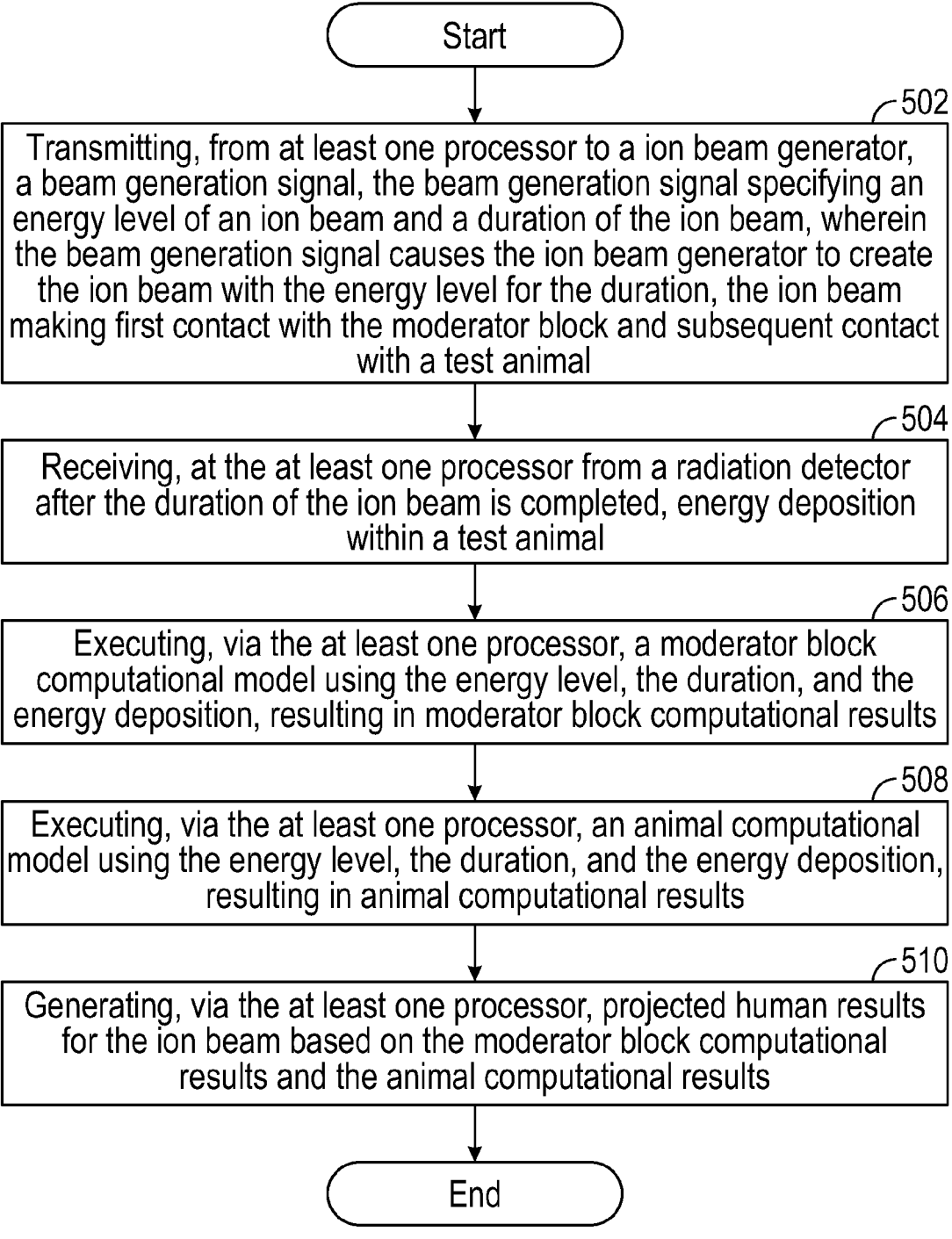
FIG. 5 illustrates an example method embodiment.

FIG. 5 illustrates an exemplary method embodiment. A system configured as disclosed herein can transmit, from at least one processor to a ion beam generator, a beam generation signal, the beam generation signal specifying an energy level of an ion beam and a duration of the ion beam, wherein the beam generation signal causes the ion beam generator to create the ion beam with the energy level for the duration, the ion beam making first contact with the moderator block and subsequent contact with a test animal (502). The system can then receive, at the at least one processor from a radiation detector after the duration of the ion beam is completed, energy deposition within a test animal (504). The system can execute, via the at least one processor, a moderator block computational model using the energy level, the duration, and the energy deposition, resulting in moderator block computational results (506), and can execute, via the at least one processor, an animal computational model using the energy level, the duration, and the energy deposition, resulting in animal computational results (508). The system can then generate, via the at least one processor, projected human results for the ion beam based on the moderator block computational results and the animal computational results (510).

In some configurations, the projected human results are three-dimensional.

In some configurations, the generating of the projected human results via the processor comprises executing a Monte Carlo simulation, wherein inputs to the Monte Carlo simulation comprise the moderator block computational results and the animal computational results.

In some configurations, wherein the ion beam comprises iron ions. In such configurations, the iron ions can be selectively degraded by the moderator block, resulting in a degraded ion beam, such that the subsequent contact of the degraded ion beam with the test animal simulates an intravehicular space radiation environment. Likewise, in such configurations the intravehicular space radiation environment can be based on at least one of: data collected by a space shuttle mission, data collected during the Mir 18 mission, data collected during the Mir 19 mission, and data collected by a satellite.

In some configurations, the moderator block is constructed of a single heterogenous material.

Figure 6:
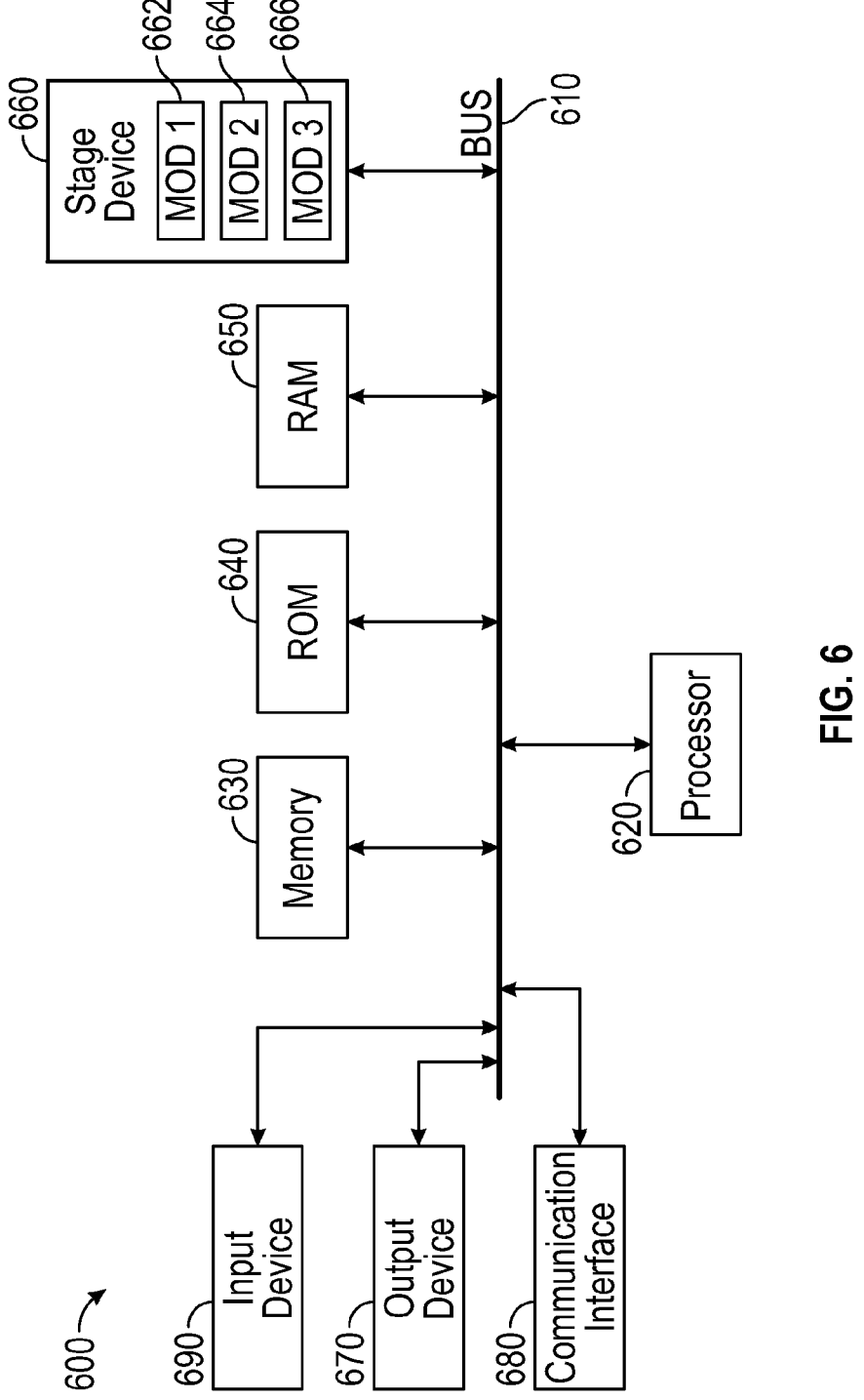
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640) and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660) such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
a ion beam generator:

a moderator block:
a radiation detector:
at least one processor; and
a non-transitory computer-readable storage medium having instructions stored which, when executed by the at least one processor, cause the at least one processor to perform operations comprising:
transmitting, from the at least one processor to the ion beam generator, a beam generation signal, the beam generation signal specifying an energy level of an ion beam and a duration of the ion beam,
wherein the beam generation signal causes the ion beam generator to create the ion beam with the energy level for the duration, the ion beam making first contact with the moderator block and subsequent contact with a test animal:
receiving, at the at least one processor from the radiation detector after the duration of the ion beam is completed, energy deposition within the test animal;
executing, via the at least one processor, a moderator block computational model using the energy level, the duration, and the energy deposition, resulting in moderator block computational results:
executing, via the at least one processor, an animal computational model using the energy level, the duration, and the energy deposition, resulting in animal computational results; and
generating, via the at least one processor, projected human results for the ion beam based on the moderator block computational results and the animal computational results.

2. The system of claim 1, wherein the projected human results are three-dimensional.

3. The system of claim 1, wherein the generating of the projected human results via the at least one processor comprises executing a Monte Carlo simulation, wherein inputs to the Monte Carlo simulation comprise the moderator block computational results and the animal computational results.

4. The system of claim 1, wherein the ion beam comprises iron ions.

5. The system of claim 4, wherein the iron ions are selectively degraded by the moderator block, resulting in a degraded ion beam, such that the subsequent contact of the degraded ion beam with the test animal simulates an intravehicular space radiation environment.

6. The system of claim 5, wherein the intravehicular space radiation environment is based on at least one of: data collected by a space shuttle mission, data collected during the Mir 18 mission, data collected during the Mir 19 mission, and data collected by a satellite.

7. The system of claim 1, wherein the moderator block is constructed of a single heterogenous material.

8. A method comprising:
transmitting, from at least one processor to a ion beam generator, a beam generation signal, the beam generation signal specifying an energy level of an ion beam and a duration of the ion beam,
wherein the beam generation signal causes the ion beam generator to create the ion beam with the energy level for the duration, the ion beam making first contact with the moderator block and subsequent contact with a test animal:
receiving, at the at least one processor from a radiation detector after the duration of the ion beam is completed, energy deposition within a test animal;

executing, via the at least one processor, a moderator block computational model using the energy level, the duration, and the energy deposition, resulting in moderator block computational results:

executing, via the at least one processor, an animal computational model using the energy level, the duration, and the energy deposition, resulting in animal computational results; and generating, via the at least one processor, projected human results for the ion beam based on the moderator block computational results and the animal computational results.

9. The method of claim 8, wherein the projected human results are three-dimensional.

10. The method of claim 8, wherein the generating of the projected human results via the processor comprises executing a Monte Carlo simulation, wherein inputs to the Monte Carlo simulation comprise the moderator block computational results and the animal computational results.

11. The method of claim 8, wherein the ion beam comprises iron ions.

12. The method of claim 11, wherein the iron ions are selectively degraded by the moderator block, resulting in a degraded ion beam, such that the subsequent contact of the degraded ion beam with the test animal simulates an intravehicular space radiation environment.

13. The method of claim 12, wherein the intravehicular space radiation environment is based on at least one of: data collected by a space shuttle mission, data collected during the Mir 18 mission, data collected during the Mir 19 mission, and data collected by a satellite.

14. The method of claim 8, wherein the moderator block is constructed of a single heterogenous material.

15. A non-transitory computer-readable storage medium having instructions stored which, when executed by at least one processor, cause the at least one processor to perform operations comprising:

transmitting, from at least one processor to the ion beam generator, a beam generation signal, the beam generation signal specifying an energy level of an ion beam and a duration of the ion beam, wherein the beam generation signal causes the ion beam generator to create the ion beam with the energy level for the duration, the ion beam making first contact with the moderator block and subsequent contact with a test animal;

receiving, at the at least one processor from the radiation detector after the duration of the ion beam is completed, energy deposition within the test animal;

executing, via the at least one processor, a moderator block computational model using the energy level, the duration, and the energy deposition, resulting in moderator block computational results;

executing, via the at least one processor, an animal computational model using the energy level, the duration, and the energy deposition, resulting in animal computational results; and generating, via the at least one processor, projected human results for the ion beam based on the moderator block computational results and the animal computational results.

16. The non-transitory computer-readable storage medium of claim 15, wherein the projected human results are three-dimensional.

17. The non-transitory computer-readable storage medium of claim 15, wherein the generating of the projected human results via the at least one processor comprises executing a Monte Carlo simulation, wherein inputs to the Monte Carlo simulation comprise the moderator block computational results and the animal computational results.

18. The non-transitory computer-readable storage medium of claim 15, wherein the ion beam comprises iron ions.

19. The non-transitory computer-readable storage medium of claim 18, wherein the iron ions are selectively degraded by the moderator block, resulting in a degraded ion beam, such that the subsequent contact of the degraded ion beam with the test animal simulates an intravehicular space radiation environment.

20. The non-transitory computer-readable storage medium of claim 19, wherein the intravehicular space radiation environment is based on at least one of: data collected by a space shuttle mission, data collected during the Mir 18 mission, data collected during the Mir 19 mission, and data collected by a satellite.

\* \* \* \* \*